United States Patent [19]
Delhaes

[11] Patent Number: 4,573,563
[45] Date of Patent: Mar. 4, 1986

[54] TRANSPORT ROLLER, ESPECIALLY FOR TRANSPORTING PAPER

[75] Inventor: Johannes C. Delhaes, Heerlen, Netherlands

[73] Assignee: Rubber- en Kunststoffabriek ENBI, B. V., Nuth, Netherlands

[21] Appl. No.: 746,368

[22] Filed: Jun. 19, 1985

[30] Foreign Application Priority Data

Jul. 3, 1984 [DE] Fed. Rep. of Germany ....... 3424396

[51] Int. Cl.⁴ .............................................. B65G 39/07
[52] U.S. Cl. ........................................ 193/37; 29/129; 29/110
[58] Field of Search .................... 193/37; 29/110, 126, 29/129; 198/840, 844, 846, 847; 474/190, 191

[56] References Cited

U.S. PATENT DOCUMENTS

| | | | |
|---|---|---|---|
| 2,616,633 | 11/1952 | Reynolds | 29/129 X |
| 2,950,097 | 8/1960 | Tohir | 29/129 X |
| 3,389,448 | 6/1968 | Buysch | 29/110 |
| 4,015,484 | 4/1977 | Taylor | 198/840 X |
| 4,203,509 | 5/1980 | Thompson et al. | 193/37 |

*Primary Examiner*—Jeffrey V. Nase
*Assistant Examiner*—L. E. Williams
*Attorney, Agent, or Firm*—W. G. Fasse; D. H. Kane, Jr.

[57] ABSTRACT

A transport roller, especially for transporting sheet material such as sheets of paper, has a rigid core surrounded by a friction increasing jacket of elastic material. At least one member is inserted between the jacket and the roller for preventing a relative axial displacement between the core and the jacket. Such member is an endless helical spring partially embedded in the jacket and projecting into a ring groove in the core, whereby the jacket is firmly held in place on the core against any relative axial displacement.

6 Claims, 3 Drawing Figures

TRANSPORT ROLLER, ESPECIALLY FOR TRANSPORTING PAPER

FIELD OF THE INVENTION

The invention relates to a transport roller, especially for transporting paper such as sheets of paper. Such rollers have a solid roller core surrounded by an elastic roller jacket. The roller jacket has a radially inner surface in contact with a radially outer surface of the solid roller core, whereby the roller jacket is held in place by a biasing force effective radially inwardly.

DESCRIPTION OF THE PRIOR ART

Such rollers are well known and are used, for example, for transporting paper such as sheets of paper. By using different materials for the solid core and the elastic roller jacket, the advantage is obtained that it is not necessary to exchange a roller completely when the jacket surface is no longer fully functional due to wear and tear.

However, known rollers having a separate core and a separate roller jacket have the disadvantage that keeping the roller jacket on the roller core poses a problem, especially when the elasticity of the jacket material increases, whereby the roller jacket has the tendency to travel in an axial direction along the roller core. On the other hand it is desirable to make the roller jacket of a material having a high elasticity because such material provides the necessary friction for the transport purposes. Thus, heretofore, it has been customary to produce rollers having the required good surface friction as a unitary, integral component in which the elastic material forms the core and the outer surface of the core as a single piece. Accordingly, such rollers must be replaced entirely when a certain degree of wear and tear has been reached. In other words, such rollers even require the replacement of the bearing sleeve on which the roller body has been attached by a vulcanizing process.

OBJECTS OF THE INVENTION

In view of the foregoing it is the aim of the invention to achieve the following objects singly or in combination:

to provide a transport roller which has an exchangeable roller jacket of elastic material properly held on a roller core against axial displacement between the roller core and the roller jacket, while still providing the required friction;

to secure the roller jacket of elastic material to the solid roller core in such a manner that the securing prevents the relative axial movement between the roller core and the roller jacket while simultaneously permitting the easy exchange of the roller jacket on a still useful roller core; and to prevent an axial stretching as well as an axial contraction of the elastic roller jacket material.

SUMMARY OF THE INVENTION

According to the invention there is provided a transport roller having a solid roller core and an elastic roller jacket surrounding the solid roller core, wherein at least one helical spring, connected at its ends to form an endless ring, is embedded in the roller jacket in such a manner that the spring projects radially inwardly from the radially inner surface of the roller jacket, whereby this projecting portion of the endless helical spring engages in a radially outwardly facing ring groove in the outer surface of the roller core. Due to the provision of at least one such endless helical spring which engages both the roller core and the highly elastic roller jacket, the latter is prevented from travelling axially relative to the roller core. Preferably, the endless helical spring engages the ring groove in the roller core with a radially inwardly directed biasing force, whereby the spring holds the roller jacket tightly on the roller core due to the solid connection between the spring and the roller jacket.

BRIEF DESCRIPTION OF THE DRAWINGS

The invention will now be described by way of example, with reference to the accompanying drawings, wherein.

DETAILED DESCRIPTION OF PREFERRED EXAMPLE EMBODIMENTS AND OF THE BEST MODE OF THE INVENTION

Figure 1:
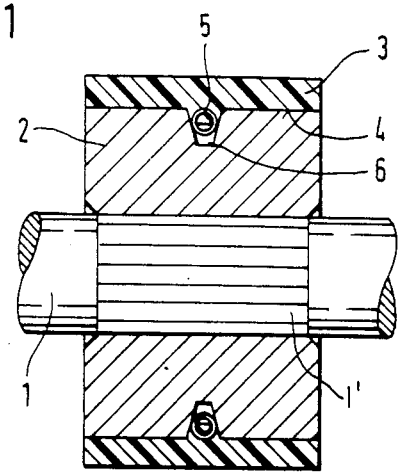
FIG. 1 is a sectional view through a roller according to the invention in which one endless spring is provided between the roller jacket and the roller core.

FIG. 1 shows a roller shaft 1 shown partly broken away and carrying a solid roller core 2 conventionally secured to the shaft 1 which may be provided with rifling 1' for a secure attachment of the core 2 to the shaft 1. The outer surface of the core 2 is surrounded by a jacket 3 made of an elastical, flexible material. According to the invention an endless helical spring 5 is partially embedded in the inwardly facing surface 4 of the jacket 3. The endless helical spring 5 is located centrally between the ends of the jacket 3. The spring 5 is so embedded in the material of the jacket 3 that at least a cross-sectional portion of the spring 5 projects radially inwardly from the inner surface 4 of the jacket 3. The ends of the springs 5 are connected to each other so as to provide an endless spring which reaches radially inwardly into a groove 6 which is open radially outwardly in the surface of the core 2. By making the bottom of the groove 6 narrower in the axial direction than the axial width of the projecting helical spring 5, it is assured that the spring 5 is wedged into the groove 6, whereby any axial play between the spring 5 and the groove 6 is avoided in a simple, yet effective manner. This wedging action is further enhanced by making the radial depth D of the groove 6 larger than the radial projection P of the helical spring 5.

Further, the helical spring 5 is so dimensioned that it generates a radially inwardly directed biasing force so that this biasing force tends to press the helical spring 5 into the groove 6 in such a manner that any axial play between the groove and the spring is avoided. This feature simultaneously assures a reduction in the wear and tear because it positively prevents any back and forth movement of the spring and thus also of the roller jacket 3. Such movement would enhance wear and tear.

It has been found that even highly elastic material such as rubber forming the jacket 3 can be held in place on a solid, rigid roller core 2 by just one helical, endless spring 5 embedded in the jacket material. If only one spring is used it is preferable to place it centrally between the ends of the roller.

Figure 2:
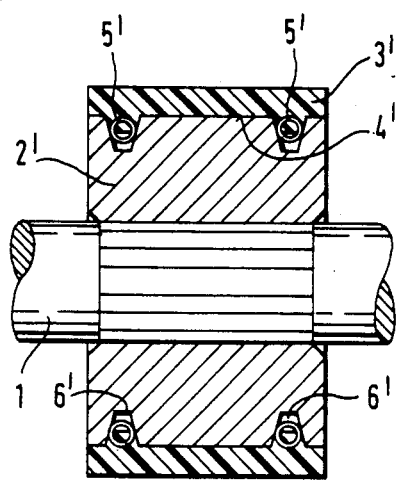
FIG. 2 is a sectional view similar to that of FIG. 1, however, showing two endless helical springs interposed between the roller jacket and the roller core.
Figure 3:
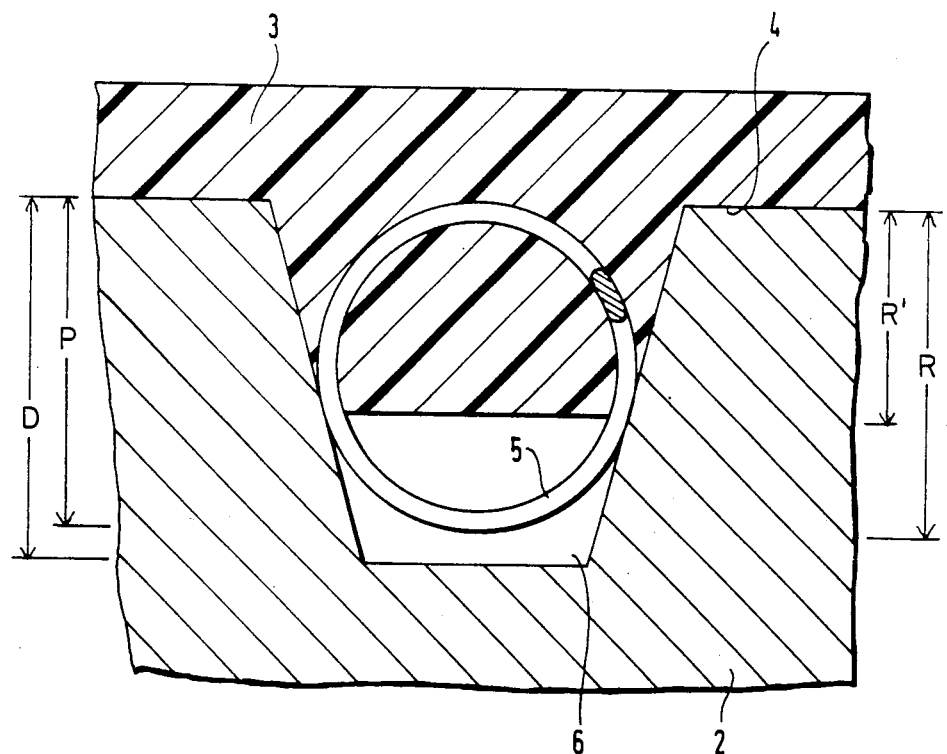
FIG. 3 is a sectional view, on an enlarged scale, showing the embedding depth of the spring in the jacket.

It has been found that even for transport rollers having a substantial axial length, one helical spring is sufficient. However, it may be desirable to use two endless helical springs 5' as shown in FIG. 2. These springs 5' are embedded in the radially inner surface 4' of the outer jacket 3' of elastic material near the edges of the jacket 3'. The rigid or solid core 2' solidly secured to the shaft 1 is provided correspondingly with two grooves 6' also preferably having a trapezoidal cross-section as shown in FIGS. 1, 2. By using one helical spring 5' adjacent each edge of the jacket it is possible to prevent an axial expansion and an axial contraction of the elastic roller jacket material in addition to any relatively axial movement between the jacket 3' and the core 2'. It has been found to be quite effective to embed the helical springs 5, 5' to such an extent that the windings of the helical springs are enveloped by the elastically deformable material of the roller jackets 3, 3' to an embedding depth R' which is a portion of the spring coil diameter R shown in FIG. 3. For example, the embedding depth R' of the springs 5, 5' reaches radially inwardly up to about the radius of the helical spring coil.

Due to the substantially rigid connection of the roller jacket 3, 3' on the roller core 2, 2' it is now possible to make the roller jacket 3, 3' of an elastically deformable material having a Shore hardness of less than 40. Such material is known under the name LIM (Liquid Injection Moulding). Such material is suitable for liquid injection molding purposes. Without the attachment features taught by the present invention it would not be possible to use such a material as a jacket on a transport roller. Numerous tests have shown that such a material exhibits a tendency to travel axially off the roller core. Such axial travel, without the features of the invention, takes place already after a short time and under small load conditions. Nevertheless, this material exhibits extraordinarily good friction characteristics so that it would be ideally suitable for making the jackets of transport rollers and the invention makes this possible.

By embedding the individual windings of the endless helical springs 5, 5' in the material of the jacket 3, 3' an intimate bond between the spring and the roller jacket is assured so that the danger of separation between the helical spring and the roller jacket due to a fulling motion is avoided.

It is also within the present teaching to cover the individual windings of the helical springs 5, 5', for example, with a brass coating or a bonding agent. Such coatings may be accomplished, for example, by an immersion method or by electroplating. The primary purpose of such coatings is to improve the bonding between the material of the roller jacket 3, 3' and the surface of the helical springs 5, 5'. It has been found to be advantageous to initially dimension the helical springs 5, 5' in such a manner that upon connection of the spring ends to each other, the windings touch each other and that after attaching the springs 5, 5' to the grooves 6, 6' there is a certain radially inwardly effective biasing force which causes the individual windings to be slightly spaced from each other. The spacings then permit the material of the roller jacket to even enter into the space confined inside of the helical spring or springs, whereby an especially intimate bonding between the jacket material and the spring is achieved. If desired, the hollow space inside the spring or springs may be completely filled by the jacket material.

Although the invention has been described with reference to specific example embodiments, it will be appreciated, that it is intended to cover all modifications and equivalents within the scope of the appended claims.

What I claim is:

1. In a transport roller having a rotational axis and including a solid roller core and an elastic roller jacket surrounding said roller core with a radially inwardly directed biasing force, the improvement comprising radially outwardly open ring groove means in said rigid roller core, and helical endless spring means partially embedded in said elastic roller jacket, said endless spring means having a portion projecting radially inwardly from said elastic roller jacket and reaching into said ring groove means for anchoring said elastic roller jacket against displacement in the direction of said rotational axis.

2. The roller of claim 1, wherein said ring groove means has a trapezoidal cross-section with a groove bottom of given width, and with a given radial groove depth, said projecting spring portion having a first dimension, in the direction of said rotational axis, larger than said given width of said groove bottom, said projecting spring portion having a second dimension, in the radial direction, smaller than said given radial groove depth, whereby said projecting spring portion is firmly held in said ring groove.

3. The roller of claim 1, wherein said helical endless spring means comprise a single spring located centrally between the ends of said roller jacket, and wherein said groove means comprise a single groove located centrally between the ends of said roller core for holding said single spring.

4. The roller of claim 1, wherein said helical endless spring means comprise two springs located near the ends of said roller jacket, and wherein said ring groove means comprise two grooves also located near the ends of said roller core for holding said two springs.

5. The roller of claim 1, wherein said roller jacket is made of an elastically deformable material having a Shore hardness of less than 40.

6. The roller of claim 1, wherein said helical endless spring means have a given spring coil diameter, and wherein said helical endless spring means are embedded in said elastic roller jacket up to a portion of said given spring coil diameter.

* * * * *